United States Patent [19]

Powers

[11] Patent Number: 5,464,338

[45] Date of Patent: Nov. 7, 1995

[54] FOOD PUMP

[75] Inventor: Richard G. Powers, Overland Park, Kans.

[73] Assignee: Marlen Research Corporation, Overland Park, Kans.

[21] Appl. No.: 300,442

[22] Filed: Sep. 2, 1994

[51] Int. Cl.⁶ .............................. B29C 47/92; A22C 7/00
[52] U.S. Cl. ................... 425/145; 264/40.7; 425/382.3; 425/447; 425/DIG. 228; 426/512
[58] Field of Search .................................. 425/140, 142, 425/145, DIG. 228, 447, 544, 382.3, 167; 264/40.7; 426/512

[56] References Cited

U.S. PATENT DOCUMENTS

| | | | |
|---|---|---|---|
| 4,097,962 | 7/1978 | Alley et al. | |
| 4,700,899 | 10/1987 | Powers et al. | |
| 4,735,564 | 4/1988 | Sasaki et al. | 425/145 |
| 4,806,089 | 2/1989 | Neko | 425/145 |
| 4,846,651 | 7/1989 | Matsuda et al. | 425/145 |
| 4,850,839 | 7/1989 | Cowley et al. | 425/142 |
| 4,954,301 | 9/1990 | Saeki et al. | 425/145 |
| 5,102,587 | 4/1992 | Kumamura et al. | 425/145 |
| 5,232,764 | 8/1993 | Kohno et al. | 425/145 |

OTHER PUBLICATIONS

Balluff, Inc. Brochure re BTL Linear Displacement Transducer Analog Series A, B, C, E, Digital and Series P, Catalog No. 507E, Edition 9001.
Hydro–Line Manufacturing Company Brochure, Jul. 1990, Linear Actuator Sensing and Feedback Systems.

*Primary Examiner*—Khanh P. Nguyen
*Attorney, Agent, or Firm*—Hovey, Williams, Timmons & Collins

[57] ABSTRACT

A twin-piston food pump includes a hydraulic cylinder coupled with each piston for driving the pistons and a linear transducer coupled with each cylinder for determining the positions thereof. Control circuitry coupled with the transducers determines the velocity of the cylinders and thereby the pistons and controls the application of hydraulic fluid through the cylinders to maintain a constant food product flow rate.

14 Claims, 3 Drawing Sheets

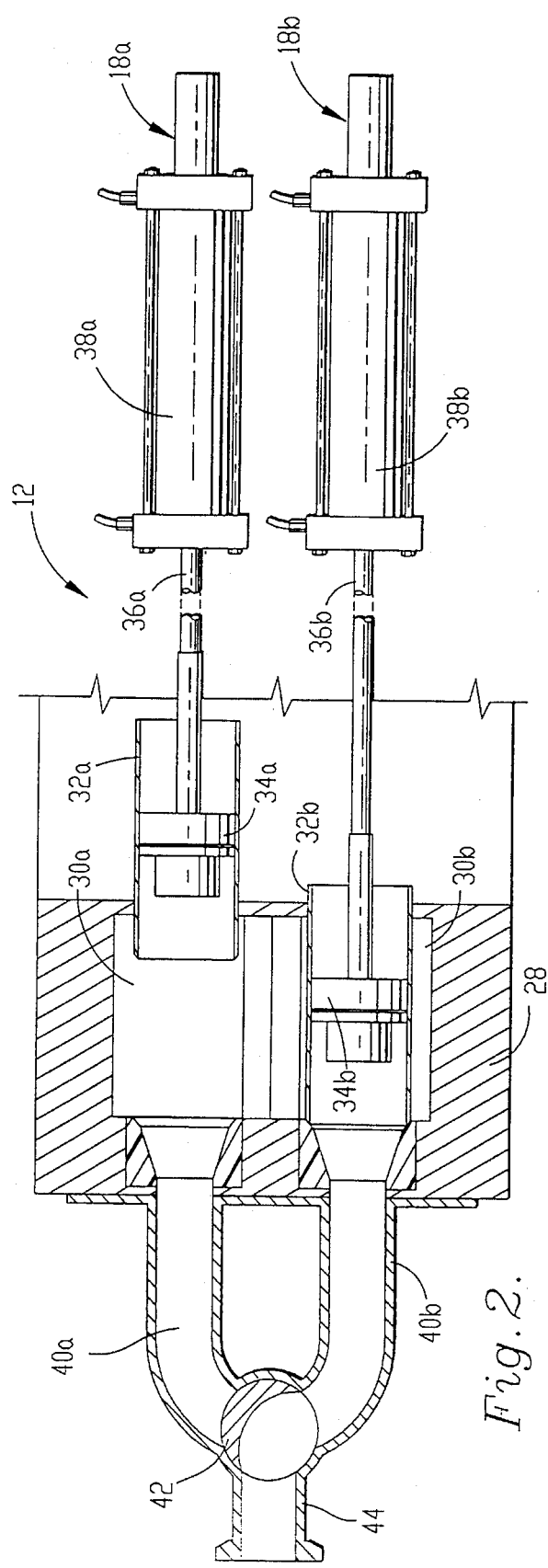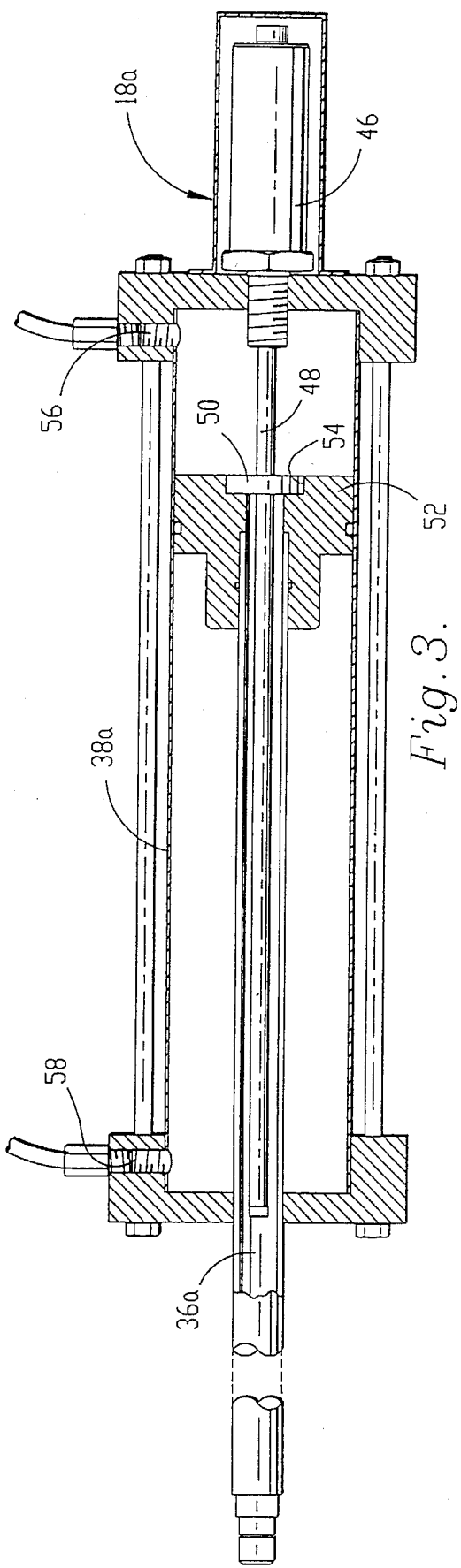

(2 Microfiche, 101 Pages)

FOOD PUMP

MICROFICHE APPENDIX

A microfiche appendix containing a source code of a computer program useful in accordance with the present invention is appended hereto as two sheets of microfiche containing 101 frames.

BACKGROUND OF THE INVENTION

1. Field of the Invention

The present invention relates to the field of twin-piston food pumps. More particularly, the invention relates to a twin-piston food pump having a hydraulic cylinder coupled with each piston for driving the pistons and a linear transducer coupled with each cylinder for determining the positions thereof. Control circuitry coupled with the transducers determines the velocity of the cylinders and thereby the pistons and controls the application of hydraulic fluid through the cylinders to maintain a constant food product flow rate.

2. Description of the Prior Art

Twin-piston food pumps have proven themselves as valuable machines for pumping food products, especially viscous products such as ground meat. As the use of piston pumps becomes more common, it becomes more important for the pumps to deliver food products at a constant rate.

A constant flow rate is especially important for continuous operations such as a so-called "chub" machine or extrusion die process where it is important to maintain weight control or the shape of an extrusion. In the prior art, however, no provision has developed for maintaining the output from a twin-piston food pump with the desired level of precision.

SUMMARY OF THE INVENTION

The food pump of the present invention solves the prior art problems discussed above and provides a distinct advance in the state of the art. More particularly, the invention hereof provides a piston food pump with the capabilities of precise rate control and precise portioning.

Broadly, the invention includes a control assembly for determining the linear velocity of the piston of a piston-type food pump, for determining the deviation in the velocity from a predetermined setting, and for producing the deviation signal representative of the deviation. An application assembly controls the application of motive force to the piston in accordance with the deviation signal for maintaining the piston velocity at the predetermined setting.

In preferred forms, the food pump includes a hydraulic cylinder coupled with the piston and supplied with hydraulic fluid for driving the piston. A linear transducer is coupled with the hydraulic cylinder for producing position signals representative of the successive positions of the cylinder and thereby the piston. Control circuitry receives the position signals and determines the piston velocity therefrom and compares the velocity with a set point corresponding to a desired food product flow rate. The application means includes an electrically operable hydraulic valve coupled in the supply of hydraulic fluid. The valve is responsive to the deviation signal for changing the supply of hydraulic fluid through the cylinder for maintaining the velocity of the piston.

In other preferred forms, the control circuitry compares the travel distance of the piston to a desired distance and stops the flow of hydraulic fluid upon reaching the desired distance. This allows discharge of a discrete portion of food product corresponding to the travel distance of the piston.

BRIEF DESCRIPTION OF THE DRAWINGS

FIG. 2 is a plan view in partial section of the piston and hydraulic cylinder assembly of the food pump in FIG. 1;

FIG. 3 is a sectional view of one of the hydraulic cylinders in FIG. 1; and

DETAILED DESCRIPTION OF THE PREFERRED EMBODIMENTS

Figure 1:
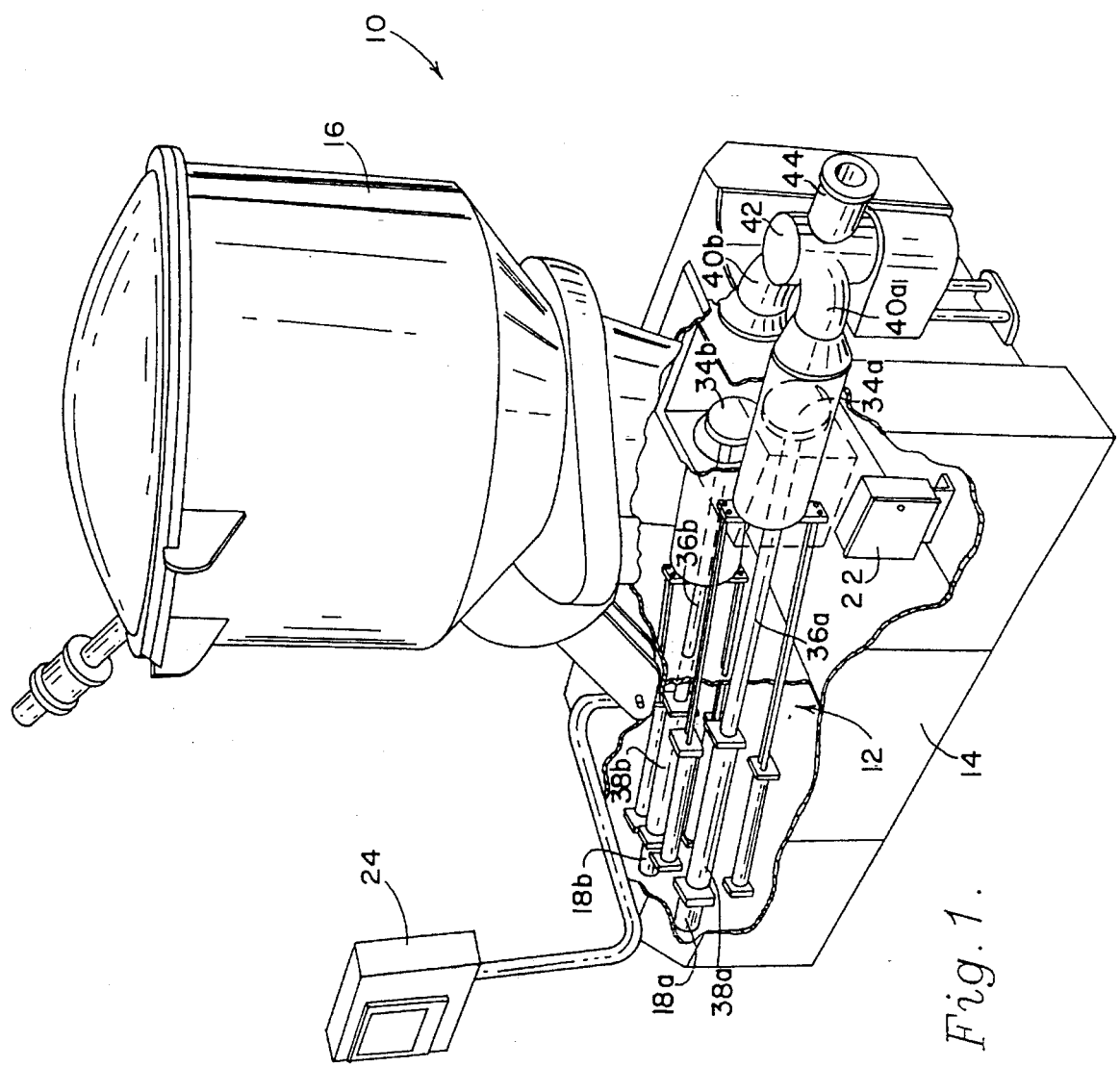
FIG. 1 is a perspective view of the preferred food pump in accordance with the present invention with portions cut away for clarity of illustration.

Referring now to the drawing figures and particular to FIG. 1, food pump 10 includes piston and cylinder assembly 12 enclosed in housing 14 and supplied with food product from hopper 16. Food pump 10 is preferably a twin-piston food pump such as that available from Marlen Research Corporation of Overland Park, Kans. In the preferred embodiment, food pump 10 also includes linear transducers 18a and 18b, control circuitry 20 (FIG. 4) enclosed in circuit housing 22, touch screen 24, and hydraulic valve 26.

Piston and cylinder assembly 12 (FIG. 2) includes piston housing 28 presenting piston cavities 30a and 30b, piston cylinders 32a and 32b slidably received in cavities 30a,b, food pistons 34a and 34b respectively coupled by piston rods 36a and 36b with hydraulic cylinders 38a and 38b. Discharge pipes 40a and 40b receive food product discharged from cavities 30a,b. The opposite ends of pipes 40a,b are coupled by rotatable food valve 42 to present a common discharge at outlet pipe 44.

Linear transducers 18a,b are coupled respectively with the ends of hydraulic cylinders 38a,b as shown in FIG. 2 and in more detail in FIG. 3. Transducers 18a,b are preferably Model TTS-RBU014 available from MTS Systems Corp. As shown in FIG. 3, transducer 18a includes transducer body 46, elongated wand 48 coupled with transducer body 46 and a ring shaped magnet 50 for receiving wand 48 therein. Hydraulic cylinder rod 36a presents a tubular configuration for receiving wand 48 therein.

Hydraulic cylinder piston 52 is machined to present magnet-receiving cavity 54 for placement of transducer magnet 50 therein. In this way, as hydraulic fluid enters cylinder 38a through port 56 and discharges through port 58, hydraulic cylinder piston 52 moves leftwardly as shown in FIG. 3 and magnet 50 moves therewith along the length of wand 48, which remains stationary. The movement of magnet 50 relative to wand 48 results in an analog output signal from transducer 18a representative of the position of magnet 50 relative to wand 48, which in turn is representative of a position of piston rod 36a and thereby the position of food piston 34a. The operation of hydraulic cylinder 38b, transducer 18b and piston 34b is the same.

Figure 4:
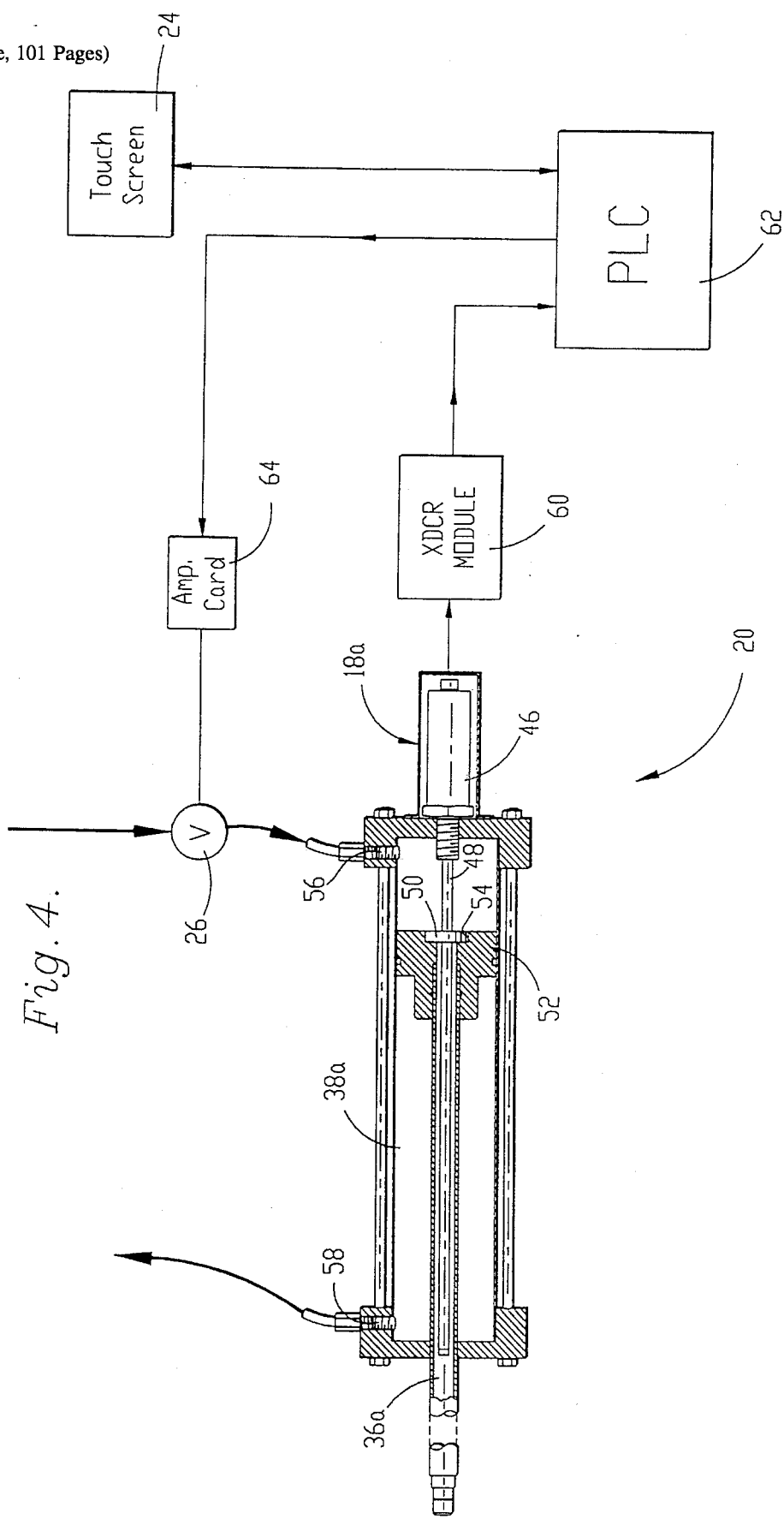
FIG. 4 is a schematic representation of the control circuitry for operating the food pump pistons shown coupled with the hydraulic cylinder of FIG. 3 and a hydraulic fluid valve.

Turning now to FIG. 4, control circuitry 20 includes a pair of output modules 60 for each transducer 18a,b, programmable logic controller (PLC) 62, and valve driver amplifier card 64. Transducers 18a,b are respectively coupled with modules 60 which receive the analog transducer inputs and produce a first output signal as a position signal supplied to PLC 62 representative of the position of respective food pistons 32a,b and a second output signal as a velocity signal, also supplied to PLC 62. Each module 60 determines the velocity of pistons 32a,b by determining the rate of change of the piston positions over time. The preferred modules 60 are Model No. 311001004RBU0140 available from MTS Systems Corp.

PLC 62 is preferably Model SLC 503 available from Allen Bradley and receives the position and velocity signals from modules 60. PLC 62 is also coupled with touch screen 24 (preferably Model PGI100G2M1R0 available from Uticor) for receiving set point information therefrom and providing screen displays thereto. The operation of PLC 62 is controlled by a program in the form of a ladder diagram shown in the microfiche appendix and incorporated herein by reference as part of the disclosure.

PLC 62 provides an output to amplifier card 64 which is preferably Model ECM4-L4-A3-Y6012 available from Continental Hydraulics Company which in turn provides a control signal to electrically controlled hydraulic valve 26 (Model ED03M-SAC-GD-24L also available from Continental Hydraulics Company). Valve 26 is coupled in the supply of hydraulic fluid to hydraulic cylinders 38a,b as part of the conventional hydraulic system of food pump 10.

In operation, transducers 18a,b provide continuous position information concerning the linear positions of the respective piston and cylinder assemblies, and in particular the position of transducer magnets 50 relative to transducer wands 48. These linear positions in turn relate to the positions of hydraulic cylinder pistons 52 and food pump pistons 34a,b. The analog signals from transducers 18a,b are processed in modules 60 to provide the position and velocity signals discussed above in a form compatible for input to PLC 62.

For constant velocity operation, PLC 62 scales the velocity signals from modules 60 into a form compatible with amplifier card 64. PLC 62 also supplies a set point signal to card 64 representative of the desired food pumping rate set by the operator on touch screen 24. Amplifier card 64 compares the velocity signal representative of the forward linear velocity of food pistons 34a,b with the set point signal to determine a deviation and produce a corresponding deviation signal supplied to valve 26. This deviation signal, or control signal, is proportional to the deviation from the set point and is in the form of a current signal supplied to valve 26. Valve 26 is operable to supply a volume of hydraulic fluid in proportion to the level of the current signal. Thus, as the level of the control signal increases, valve 26 opens to allow a proportionate increase in the flow of hydraulic fluid to a respective cylinder 38a,b by way of port 26. Similarly, a decrease in the level of the control signal causes valve 26 to move toward the closed position and proportionately reduce the hydraulic fluid flow.

In the operation of food pump 10, pistons 34a,b are operated to alternate strokes so that as one piston is moving forward to supply food product through outlet 44, the other is retracted and receiving a new charge of food product from hopper 16. As a food piston 34a,b nears the completion of its forward travel, the other food piston begins its forward travel and valve 42 beings to rotate to change the flow from one piston to the other. During the transition, there is a short time in which flow is being provided from both pistons 34,b.

During food pump operation, the combination of transducers 18a,b, control circuitry 20 and valve 26 cooperate to maintain a constant forward velocity of pistons 34a,b which in turn maintains a constant rate of flow of food product according to the set point. In general, control with a deviation of less than 1% from the set point is maintained with the present invention compared to deviations in excess of 3% in the prior art. A precision of 1% or better is important for food product weight control.

During the transition of food valve 42, PLC 62 provides velocity information concerning both pistons 34a,b to card 64. This allows control of both forward speeds during this transition to maintain the constant flow rate of food product. In particular, during transition, hydraulic valve 26 supplies fluid to both hydraulic cylinders 38a,b. After the transition, the flow through hydraulic valve 26 is supplied to only one of hydraulic cylinders 38a,b.

The provision of linear transducers 18a,b also allows portioning control of food pump 10. For example, PLC 62 can be used to monitor the positions of food pistons 34a,b in order to move them in discrete increments to provide corresponding discrete discharges or portions of food product from outlet pipe 44. More specifically, transducers 18a,b continuously determine positions of pistons 34a,b. This position information is monitored by PLC 64 for determining therefrom the travel distance of assembly 12 and in particular, pistons 34a,b. This travel distance is then compared with a preset distance entered by the operator by way of touch screen 24. Upon reaching the preset distance which corresponds to a food portion, PLC 64 causes hydraulic valve 26 to close which stops the movement of assembly 12. The process is then repeated for another food portion. Such an application is particularly useful for production of luncheon meats or other discrete volumes of food products.

The present invention is also useful for pressure control. In such an application, a pressure transducer such as Model 8990811 available from WIKA is coupled with the hydraulic fluid supply and provides an input representative of the hydraulic pressure to PLC 62. The hydraulic pressure is representative of the pressure of the food product at outlet pipe 44. On the basis of the hydraulic pressure, PLC controls the application of hydraulic fluid to cylinders 38a,b by way of an amplifier card (Model ECM4-L4-A3-Y6012, coupled with a proportional pressure hydraulic control valve such as Model EP03M-A225-GD- 24L-A available from Continental Hydraulics Company). This pressure control valve maintains a constant pressure on hydraulic cylinders 38a,b, according to a set point entered by way of touch screen 24.

Those skilled in the art will also appreciate that the present invention encompasses many variations in the preferred embodiments described herein. For example, a microprocessor based controller could be substituted for the preferred PLC and provided with a conventional program instead of the ladder programming of the microfiche appendix. Alternatively, all of the functions could be implemented in hardware using a application specific integrated circuit, for example. It will also be appreciated that transducers could be mounted on assembly 12 at other locations to monitor the linear positions and velocities. As a final example, the present invention presents utility with single piston food pumps also.

Having thus described the preferred embodiments of the present invention, the following is claimed as new and desired to be secured by Letters Patent:

1. In a food pump having at least one, linearly movable piston for pumping a food product in accordance with motive force applied to the piston, an apparatus for controlling the movement of the piston comprising:

control means for determining the linear velocity of the piston during at least a portion of the linear movement thereof, for determining the deviation in said linear velocity from a predetermined setting, and for producing a deviation signal representative of said deviation; and application means for receiving said deviation signal and responsive thereto for changing the application of motive force to the piston in accordance with said deviation signal.

2. The apparatus as set forth in claim 1, said control means including position means for determining a succession of positions of the piston, and control circuit means for determining said linear velocity as the change in said positions over time.

3. The apparatus as set forth in claim 2, said position means including a linear transducer.

4. The apparatus as set forth in claim 3, said linear transducer including means for producing a position signal representative of the position of the piston, said control circuit means including means for receiving said position signal and responsive thereto for determining said velocity.

5. The apparatus as set forth in claim 4, said control circuit means including an electronic controller.

6. The apparatus as set forth in claim 5, said electronic controller including a programmable logic controller.

7. The apparatus as set forth in claim 1, the pump including a hydraulic cylinder supplied with hydraulic fluid from a source thereof and coupled with the piston for applying the motive force thereto, said application means including fluid control means for controlling the supply of hydraulic fluid to the hydraulic cylinder.

8. The apparatus as set forth in claim 7, said fluid control means including a hydraulic valve.

9. The apparatus as set forth in claim 8, said hydraulic valve including an electrically controlled proportional valve.

10. The apparatus as set forth in claim 9, said deviation signal being a proportional control signal supplied to said proportional valve.

11. The apparatus as set forth in claim 1, the pump including two of the pistons alternately operable for providing a continuous supply of food product therefrom, said application means including means for changing the application of motive force to the pistons.

12. In a food pump having two pistons alternately operable for pumping food product, each piston having a hydraulic cylinder supplied with hydraulic fluid and coupled therewith for applying motive force to a respective piston, said apparatus comprising:

a pair of linear transducers coupled with respective hydraulic cylinders for determining the linear positions thereof and thereby for determining the linear positions of the corresponding pistons, said transducers including means for producing respective position signals representative of said linear positions;

transducer circuitry coupled with said transducers for receiving said position signals and responsive thereto for determining the linear velocities of the cylinders as the change in cylinder position over time and for producing respective velocity signals representative of said linear velocities;

means for receiving an input representative of a desired velocity of the pistons corresponding to a desired rate of flow of the food product and for producing a set point signal representative thereof;

control circuit means for receiving and comparing said velocity and set point signals for determining the deviation in said velocity from said desired velocity and for producing a control signal representative of said deviation;

an electrically operable hydraulic valve coupled with the supply of hydraulic fluid to the hydraulic cylinders, and coupled with said control circuit means for receiving said control signal and responsive thereto for controlling the application of hydraulic fluid to the cylinders for controlling the linear velocity thereof in accordance with said deviation signal for maintaining said linear velocities at said desired velocity.

13. In a food pump having at least one, piston and cylinder assembly including a linearly moveable piston for pumping a food product and a linearly moveable hydraulic cylinder coupled the piston and supplied with hydraulic fluid for moving the piston, an apparatus for controlling the movement of the piston and cylinder assembly comprising:

a linear transducer coupled with the assembly for continuously determining the linear positions thereof, said transducer including means for producing position signals representative of said linear positions;

an electrically operable hydraulic valve coupled in the supply of hydraulic fluid to the valve, said valve being shiftable between open and closed positions for starting and stopping movements of the cylinder and thereby the piston; and a control circuit coupled with said transducer and valve including means for receiving said position signals for determining therefrom the travel distance of the assembly, and means for comparing said travel distance with a preset distance for shifting said valve to said closed position upon reaching said preset distance for stopping movement of the piston and cylinder assembly.

14. The apparatus as set forth in claim 13, said travel distance corresponding to a portion of the food product, said control circuit including means for causing said assembly to move through a succession of discrete travel distances so that said pump produces a corresponding succession of food product portions.

* * * * *